United States Patent
Koeppendoerfer et al.

(10) Patent No.: US 9,871,559 B2
(45) Date of Patent: Jan. 16, 2018

(54) MOTOR VEHICLE ON-BOARD POWER SYSTEM AND METHOD FOR TRANSMITTING DATA SIGNALS IN A MOTOR VEHICLE ON-BOARD POWER SYSTEM

(71) Applicant: LEONI KABEL HOLDING GMBH, Nuremberg (DE)

(72) Inventors: Erwin Koeppendoerfer, Schwabach (DE); Rainer Poehmerer, Winkelhaid (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 15/005,185

(22) Filed: Jan. 25, 2016

(65) Prior Publication Data

US 2016/0142102 A1 May 19, 2016

Related U.S. Application Data

(63) Continuation of application No. PCT/EP2014/065313, filed on Jul. 16, 2014.

(30) Foreign Application Priority Data

Jul. 25, 2013 (DE) .......... 10 2013 012 368

(51) Int. Cl.
*H04B 3/54* (2006.01)
*H04L 12/10* (2006.01)
(Continued)

(52) U.S. Cl.
CPC ............. *H04B 3/548* (2013.01); *H04L 12/10* (2013.01); *H04L 12/40045* (2013.01);
(Continued)

(58) Field of Classification Search
CPC ...... H04W 4/18; H04L 67/10; G07C 9/00015; G08C 17/02
(Continued)

(56) References Cited

U.S. PATENT DOCUMENTS

| 6,943,668 B2* | 9/2005 | Gaus, Jr. | ................ H04B 3/546 340/12.33 |
| 9,285,783 B2* | 3/2016 | Craig | ..................... G05B 13/02 |

(Continued)

FOREIGN PATENT DOCUMENTS

DE         10246261 A1      4/2004

OTHER PUBLICATIONS

Robert Heile et al.: "Smart Grid Tutorial—ZigBee Smart Energy Overview; 15-09-0770-00-0000-smartgrid-tutorial-zigbee-smart-energy-overview", IEEE Draft; 15-09-0770-00-0000-Smartgrid-Tutorial-Zigbee-Smart-Energy-Overview, IEEE-SA Mentor, Piscataway, NJ USA, vol. 802.15WG, Nov. 17, 2009, (Nov. 17, 2009), pp. 1-23, XP017666302,[found on the internet Nov. 17, 2009].

(Continued)

*Primary Examiner* — Vernal Brown
(74) *Attorney, Agent, or Firm* — Laurence A. Greenberg; Werner H. Stemer; Ralph E. Locher

(57) ABSTRACT

In order to permit, in a motor vehicle on-board power system, data to be transmitted with low expenditure on cabling, even between multiple partial networks, a plurality of loads embodied, in particular, as sensors is respectively assigned a communication unit for transferring data. The communication units are embodied in such a way that, by utilizing the supply lines they set up a partially interlinked data network, and transfer data made available by the loads, with the result that communication via the partial networks is also made possible. As a result of the transmission of the (Continued)

data via the supply lines in combination with the setting up of a partially interlinked data network, signal transmission is made possible even if there is no direct connection between the respective sensor and a target unit.

10 Claims, 1 Drawing Sheet

(51) Int. Cl.
*H04L 12/40* (2006.01)
*H04L 29/08* (2006.01)

(52) U.S. Cl.
CPC ........ *H04L 67/12* (2013.01); *H04B 2203/547* (2013.01); *H04B 2203/5445* (2013.01); *H04L 2012/40215* (2013.01); *H04L 2012/40273* (2013.01)

(58) Field of Classification Search
USPC ...................................... 340/12.32
See application file for complete search history.

(56) References Cited

U.S. PATENT DOCUMENTS

| | | | |
|---|---|---|---|
| 2003/0076221 A1* | 4/2003 | Akiyama | H04L 12/40182 340/12.32 |
| 2007/0013492 A1* | 1/2007 | Yanagida | H02J 13/002 307/9.1 |
| 2010/0146776 A1 | 6/2010 | Yamauchi et al. | |
| 2011/0064126 A1 | 3/2011 | Ishiko | |
| 2011/0196547 A1* | 8/2011 | Park | G06Q 50/06 700/296 |
| 2012/0146776 A1 | 6/2012 | Eguchi | |
| 2014/0064388 A1* | 3/2014 | Wang | H04B 3/548 375/257 |

OTHER PUBLICATIONS

Mark Hazen: "Powerline Communications Cross-phase Coupling", 26003283 Revision 2, Dec. 31, 2007, (Dec. 31, 2007), XP055148716.

\* cited by examiner

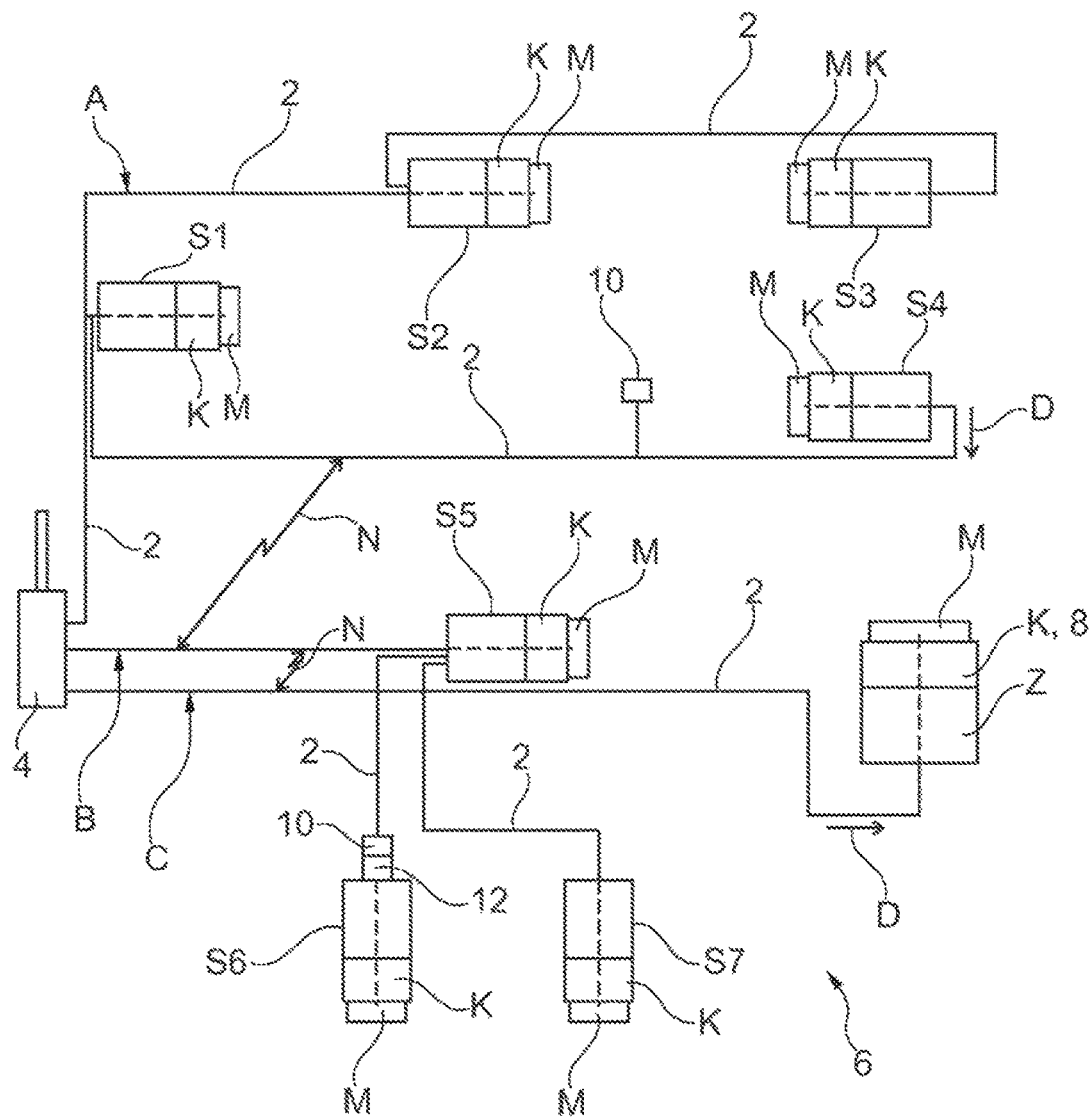

MOTOR VEHICLE ON-BOARD POWER SYSTEM AND METHOD FOR TRANSMITTING DATA SIGNALS IN A MOTOR VEHICLE ON-BOARD POWER SYSTEM

CROSS-REFERENCE TO RELATED APPLICATION

This is a continuation application, under 35 U.S.C. §120, of copending international application No. PCT/EP2014/065313, filed Jul. 16, 2014, which designated the United States; this application also claims the priority, under 35 U.S.C. §119, of German patent application No. DE 10 2013 012 368.2, filed Jul. 25, 2013; the prior applications are herewith incorporated by reference in their entirety.

BACKGROUND OF THE INVENTION

Field of the Invention

The invention relates to a motor vehicle on-board power system and a method for transmitting data signals in a motor vehicle.

An on-board power system of this type and a method of this type can be found, for example, in U.S. patent publication No. 2010/0146776 A1.

In a motor vehicle on-board power system, a multiplicity of consumers are connected via supply lines of the on-board power system to a current and voltage source, normally the motor vehicle battery, for the current and/or voltage supply. Along with power consumers such as, for example, servomotors, etc., a multiplicity of small consumers, for example sensors or actuators, which are used to an increasing extent in motor vehicles to increase safety, comfort, and also in respect of driver assistance systems, can be found in an on-board power system. Sensors of this type are, for example, temperature sensors, distance sensors etc. The data of such signal transmitters are transferred via data lines to receivers, normally control devices, and are evaluated there.

Data buses, such as, for example, a controller area network (CAN) or a local interconnect network (LIN) bus systems are already known in motor vehicle on-board power systems for data transmission. The individual actuators/sensors are connected via a data line to these field buses.

With the increase in signal transmitters such as sensors or actuators, the wiring requirement is constantly increasing. Along with the supply line, a data line is in each case also always required.

A power line communication system is described in U.S. patent publication No. 2012/0146776 A1, in which a master participant and a plurality of slave participants are interconnected via a power supply line for data transmission. The communication network is a closed network in which a specific group of slave participants which are arranged, for example, inside a door, are controlled via the master participant. The communication is controlled by a time-triggered communication protocol in which time windows are allocated by the master participant to the individual slave participants, in which windows they are ready for the transmission or reception of signals.

SUMMARY OF THE INVENTION

On this basis, the object of the invention is to enable a motor vehicle on-board power system in which the wiring requirement is minimized.

The object is achieved according to the invention by a motor vehicle on-board power system with the features of main apparatus claim and by a method with the features of main method claim. The advantages indicated in respect of the on-board power system and preferred designs are to be transferred analogously to the method also.

The motor vehicle on-board power system contains a number of consumers which are connected in each case to an electrical supply line for the current and/or voltage supply. A communication unit to which the respective consumer is connected for data transfer is allocated in each case to at least a plurality of consumers, preferably sensors or actuators. The communication units are furthermore configured in such a way that they set up a meshed data network using the power supply lines and transfer data via the power supply lines, the data being made available by the consumers allocated to them.

This concept is based essentially on the combination of the data transmission via supply lines known per se, as known, for example by the term "power LAN" or "power line communication (PLC)". However, this is configured only for a point-to-point communication between two directly connected devices and cannot therefore be transferred as such initially to an on-board power system. According to U.S. patent publication No. 2012/0146776 A1, this problem is solved by the time-triggered communication protocol, so that a point-to-point communication can take place in each case during the different timeslots.

In contrast, in the present case, the known PLC technology is extended and combined with a special data transmission network in which a so-called meshed network is in fact set up via these supply lines. The decisive advantage here can be seen in that, by setting up a meshed network, transfers of data between a consumer and a destination device or terminal device, such as, for example a control unit, are possible even if no direct point-to-point line connection exists between the consumer and the destination device. It is fundamental here that the individual consumers themselves in each case have communication units which process the received data and, unless they are intended for the current consumer itself, forward them to a next communication unit, also referred to as a node. In this respect, the individual communication units are configured, in a manner of speaking, as repeaters, via which the data are, where appropriate, amplified and forwarded.

The on-board power system is furthermore characterized in that it has a plurality of subnet works which are separated from one another. The meshed data network extends over the separate subnet works so that a communication between two communication units in different subnet works is enabled. In an on-board power system, there are normally pluralities of subnet works which are separated from one another and have no direct line connection to one another. The subnet works are merely connected to a common battery. However, no data transmission is possible via this common reference point. The term "separate subnet works" is generally understood to mean that the different subnet works of the on-board power system are not interconnected, or are not interconnected in a suitable manner for a line-connected, in particular high-frequency, data transmission.

Due to the setting up of the data network, a communication between the consumers of different subnet works is therefore also enabled without a direct, line-connected data transmission path existing between them, as is required in the case of PLC technology. The data signal is generally injected from one subnet work into the other subnet work for the transmission of the data signals from one subnet work into the other subnet work.

Through the combination of these technologies, i.e. PLC technology with the setting up of a meshed data network, a reliable data transmission, for example from sensors or actuators to control devices, is enabled in a motor vehicle on-board power system without the need for separate data lines. Through the setting up of a meshed network, the individual participants between which the communication is intended to take place do not themselves have to be directly interconnected. This results overall in a reduction in the cabling and wiring requirement and, as a result, in a weight reduction due to the concomitant elimination of individual cables.

A further fundamental advantage can be seen in that a uniform cable harness can be used for different equipment variants of a motor vehicle. Each equipment variant of a motor vehicle has hitherto required its own special cable harness, since, for example, an additional data cable has hitherto been required for an additional sensor. Cost savings, in particular, are therefore also achieved. As a result, modifications can also be made more easily, for example even during the production of the vehicle or during a production cycle, without necessarily requiring costly modifications to the cable assembly.

It is furthermore of fundamental importance that the data signals are also transmitted beyond subnet work boundaries within the data network, allowing high variability in the communication across the entire on-board power system.

For the data transmission via the supply lines, the communication units are essentially configured to modulate the data signal to be transmitted onto the existing on-board power system voltage, as is known from PLC technology.

High-frequency signals are used here with a frequency preferably in the 100 kHz range up to 100 MHz and, in particular, in the range of several tens of MHz, for example 25 MHz.

The data signals are fed or injected into the supply lines by the communication units in a known manner, and this can be performed in different ways, for example with directional couplers, baluns, antennas or also by galvanic, inductive or capacitive coupling.

With regard to the transmission of the data signals between two separate subnet works, an automatic injection and transmission of a data signal from one supply line into another supply line is preferably effected without using a special coupling element. The normally unwanted crosstalk effect is exploited here in particular, wherein a signal is injected automatically from one line into an adjacent further line. In order to guarantee this, the supply lines are preferably configured as unshielded lines. Furthermore, the supply lines of different subnet works run immediately adjacent and parallel to one another at least in some areas.

The data communication within the data network, in particular beyond the boundaries of the subnet works, is therefore essentially based on this crosstalk effect, taking into account the normal design of an on-board power system. A plurality of supply lines, even of different subnet works, are routed close to one another at least in some areas, for example in a common cable assembly area or within a common cable sheath.

Furthermore, in an advantageous design for the implementation of the fundamental concept, the individual communication units in each case form a node of the meshed data network. In the data transmission from a communication unit to a destination device which similarly forms a node of the network, the data signal to be transmitted is therefore transmitted either directly to the destination device or via a different intermediate node formed by the further communication units, insofar as no direct connection is available.

The communication units are appropriately integrated directly into the consumers. A separate connection between respective consumers and the communication units is not therefore required. The communication units are preferably integrated directly as communication modules into an electronic circuit or a chip of the respective consumers via which the data acquisitions, and, where appropriate, a first data processing are carried out.

A network protocol according to the OSI model with a protocol stack is appropriately used for the data transmission. The network protocol is therefore structured in the form of a stack with a plurality of layers which are determined according to the known OSI model.

This OSI model forms the basis for different communication protocols for meshed networks.

A special communication protocol for data transmission at low data rates is, for example, the protocol known by the name of ZigBee. The communication protocol used is preferably structured on the basis of the ZigBee protocol. The ZigBee protocol is used in wireless communication networks in particular, but is also usable in the present case in the wired, meshed data network, if necessary with suitable adaptations or modifications.

A different communication protocol known per se is the protocol known by the name of "Z-Wave", which is designed specifically for a meshed network.

It is fundamental that the individual communication units (participants) are designed not only for transmitting and receiving, but also for through-connecting and forwarding the data signals, thereby enabling a meshing of the network.

For example, according to the ZigBee standard, the individual communication units are preferably designed as routers. Each individual communication unit, which in each case forms a node of the data network, therefore switches or routes the received data signals onward and also decides, in particular, on the data path to be selected to the destination device. In particular, the respective communication unit itself decides to which nearest intermediate communication units (intermediate node) the data signal is forwarded.

For the addressing, the communication unit acting as a transmitter normally specifies a destination address which is also supplied to the data signal. Depending on the addressing type, it is possible that the route is already defined in this information, so that the individual intermediate nodes can forward the data signal according to this specification. Alternatively, a so-called indirect addressing is effected, in which the communication takes place, for example, via a so-called coordinator of the network.

One of the communication units is therefore also appropriately designed as a coordinator of this type, particularly in accordance with the ZigBee standard.

A communication unit which receives a data signal not addressed to it forwards this data signal in all cases.

On the whole, the data network is preferably configured as a so-called self-organizing or self-initiating data network. The data network with the communication units is therefore designed to recognize changes in the participants automatically and, in the case of new participants, to integrate them automatically into the data network, including, for example, an address specification for the new participant. A manual operator input is not required for this purpose. The Z-Wave standard supports a self-organization of this type.

The data transmission via the supply line is suitable only for the transmission of signals at a low transmission rate. The consumers which communicate in this way with one another or with a destination device are therefore appropriately units of a type which generate low data rates only, such as, in particular, simple sensors or actuators, for example simple operating or display elements for operating electrical components, such as, for example, switches or adjustment buttons. Image transmissions are not envisaged. Audio transmissions at low data rates, on the other hand, are possible and are also envisaged.

In a preferred development, at least one of the consumers can be plugged into a supply socket according to the plug-and-play principle at different locations of the on-board power system. For this purpose, the on-board power system has a plurality of supply sockets of this type for the reversible plug-in of consumers.

This design advantageously exploits, in particular, the self-organization of the data network. A flexible arrangement and, in particular, a free movability, for example of operating elements, is thereby enabled. In existing on-board power systems, the location of a respective operating, display or design element is permanently predefined by the manufacturer. A vendor-independent positioning of operating elements of this type is enabled by the, in particular self-organizing, data and communication network created here.

A high flexibility is generally achieved in the configuration of an on-board power system with the data network described here. Modifications to the on-board power system are possible without substantial outlay. Customer requirements can therefore still be taken into account, even at a very late stage during production or even after production.

This flexibility is extended by creating a facility for the customer, through the arrangement of supply sockets, to position consumers at different positions within the motor vehicle. The consumers are integrated automatically into the data network and can therefore, for example, communicate with a control unit. The consumers are, for example, an adjustment button for the air conditioning of the vehicle or a control button for controlling a servomotor.

Other features which are considered as characteristic for the invention are set forth in the appended claims.

Although the invention is illustrated and described herein as embodied in a motor vehicle on-board power system and a method for transmitting data signals in a motor vehicle on-board power system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of a section of a motor vehicle on-board power system according to the invention.

DETAILED DESCRIPTION OF THE INVENTION

Referring now to the single FIGURE of the drawing in detail, there is shown an on-board power system having a multiplicity of individual supply lines 2 which are, for example, connected via a power distributor 4 to a direct current and direct voltage source, in particular a motor vehicle battery. The on-board power system is subdivided into a plurality of subnet works A, B, C which are separated from one another. The term "separated from one another" is understood here to mean that a data signal D modulated onto a supply line 2 of the one subnet work A, B, C is not transferable via a line connection, i.e. not in a wired manner, onto the supply line 2 of the other subnet work A, B, C.

The individual supply lines 2 supply a multiplicity of consumers, wherein, in the example embodiment, a plurality of actuators or sensors S1-S7 are shown by way of example. These are, for example, sensors for detecting environmental conditions, or operating or switching elements that are actuated by the user. In addition, a destination device Z is connected as a further consumer to the on-board power system via the supply lines 2. This destination device is, for example, a control or evaluation unit which is configured to receive and evaluate data signals D of the individual sensors S1-S7.

Each of the sensors S1-S7, as well as the destination device Z, has an integrated communication unit K. The communication unit K is similarly connected to the respective supply line 2 to which the respective consumer S1-S7, Z is also connected. Through a suitable configuration, the communication units K in each case form a network node of a meshed data network 6. The structure shown in the FIGURE forms a meshed network structure of this type.

The communication units K receive, from a sensor part of the respective sensor S1-S7, an operating, switching or measurement signal, for example, which is to be transmitted to the destination device Z. This measurement signal is processed in the communication unit K and is made available as a high-frequency data signal according to a defined communication protocol. In particular, the actual measurement signal is thus supplemented, for example, with the destination address of the destination device Z according to the communication protocol. Using a modulator M, which is similarly preferably a component of the respective consumer S1-S7, Z, the data signal D processed in this way is then modulated as a high-frequency signal onto the on-board power system voltage which is applied to the respective supply line 2, so that the data signal D can be transmitted via the respective supply line 2 in accordance with PLC technology.

The respective supply line 2 is normally connected to a supply connection, typically a plug. The modulator M is connected to the respective supply connection for modulating the data signal D, as shown in each case by a broken line.

The communication protocol used is, for example, designed on the basis of the ZigBee protocol.

Within the data network 6, one of the consumers S1-S7, Z, in the example embodiment the destination device Z, forms a coordinator 8 which, in particular, takes charge of the administration and management of the data network 6 and, for example, controls the address allocation of the individual consumers S1-S7, Z for this purpose.

Since the individual subnet works A, B, C are interconnected only via the distributor 4 which is connected to the battery potential, the modulated HF data signal cannot be transmitted from one subnet work A, B, C into a different subnet work A, B, C in a line-connected manner. Nevertheless, in order to enable a data communication between consumers S1-S7 in different subnet works A, B, C also, the parasitic side-effect which is normally unwanted in signal transmission, i.e., in particular, that of the so-called crosstalk N, is exploited. For this purpose, it is necessary for the supply lines 2 to be unshielded and for supply lines 2 of different subnet works A, B, C to run sufficiently close to one another. Under these conditions, which normally prevail in a conventional on-board power system, the data signal D is therefore transmitted in a line-connected manner from one subnet work A, B, C into the other subnet work A, B, C and can be forwarded there in a line-connected manner to the destination address. A coupling is therefore effected between the subnet works A, B, C at high-frequency level. The design of the meshed data network 6 using PLC technology in a motor vehicle on-board power system is based in a particular manner on the exploitation of this effect.

The data network 6 is preferably a self-organizing data network 6, so that the individual consumers S1-S7 can simply be added and integrated independently and automatically into the data network 6. A manual modification of configuration settings by an operator is not required.

On the whole, this enables a very flexible design of the data network 6. In particular, this is used for the application of a plug-and-play principle. For this purpose, the on-board power system contains a plurality of supply sockets 10 via which individual consumers, in the example embodiment the consumer S6, can be connected by simply plugging them into the motor vehicle on-board power system, i.e. into one of the supply lines 2, in a reversibly interchangeable manner. To do this, the consumer S6 is provided with a connection plug 12 via which it can be connected to the supply socket 10. As soon as the consumer S6 is connected to the on-board power system, it is automatically incorporated into the communication and data network 6.

Through the combination of the data transmission via the supply lines 2 in conjunction with the setting up of a meshed data network 6 with the individual communication units K and therefore consumers S1-S7, Z as network nodes, a data transmission is advantageously enabled from the sensors S1-S7 to one or more destination devices Z without separate data lines being required. In particular, the crosstalk N is exploited for this purpose. Due to the setting up of a meshed data network 6, a direct connection of a sensor S1-S7 acting as a transmitter to the destination device Z is not required. Instead, the fact that the communication takes place via intermediate nodes is exploited in the meshed data network 6. No additional lines are required due to the data transmission via the supply lines 2. The supply network formed by the supply lines 2 is therefore upgraded to a data network 6 which forms a partially meshed network. Weight and cost savings are achieved through the elimination of the otherwise required additional data lines. Modifications can also be more simply implemented, since, for example, an additional sensor simply has to be connected to the supply network. The coordinator 8 then automatically allocates an address to this new sensor, so that it can be used as a further participant and node in the meshed data network 6.

The following is a summary list of reference numerals and the corresponding structure used in the above description of the invention:
2 Supply line
4 Power distributor
S1-S7 Sensors
Z Destination device
D Data signal
K Communication unit
M Modulation unit
6 Data network
8 Coordinator
10 Supply socket
12 Connection plug
N Crosstalk

The invention claimed is:

1. A motor vehicle on-board power system, comprising:
electrical supply lines;
a number of consumers each connected to one of said electrical supply lines;
communication units, each of said communication units integrated into a respective one of said consumers for data transmission and is assigned in each case to at least a plurality of said consumers, each individual communication unit configured as a repeater forwarding received data to a next communication unit, unless the received data is intended for the current consumer; and
a plurality of subnet works separated from one another and not interconnected, such that no line-connected data transmission is possible between the subnet works, said communication units are configured such that, using said electrical supply lines, they set up a meshed data network extending over separate ones of said subnet works, said communication units forming network nodes of the meshed data network, and process data which are made available by said consumers and transmit the data as a data signal via said supply lines so that communications between said communication units in said separate subnet works is enabled;
wherein the data signal is a high-frequency data signal and said electrical supply lines are unshielded so that the data signal injects from one of said electrical supply lines into a further one of said electrical supply lines during operation without a galvanic connection, with data communication beyond the boundaries of a subnet work occurring via a crosstalk effect.

2. The motor vehicle on-board power system according to claim 1, wherein said communication units are configured to modulate the data signals to be transmitted onto an on-board power-system voltage.

3. The motor vehicle on-board power system according to claim 1, wherein a communication protocol according to an open systems interconnection model with a protocol stack is used for data transmission.

4. The motor vehicle on-board power system according to claim 1, wherein a communication protocol based on a basis of a ZigBee industry standard is used.

5. The motor vehicle on-board power system according to claim 1, wherein said communication units are routers.

6. The motor vehicle on-board power system according to claim 1, wherein said communication units are each designed as a coordinator.

7. The motor vehicle on-board power system according to claim 1, wherein the meshed data network is a self-organizing data network.

8. The motor vehicle on-board power system according to claim 1, wherein said consumers are selected from the group consisting of actuators and sensors.

9. The motor vehicle on-board power system according to claim 1, further comprising a plurality of supply sockets and via said supply sockets at least one of said consumers is reversibly connectable according to a plug-and-play principle to the motor vehicle on-board power system at different locations of the motor vehicle on-board power system.

10. A method for transmitting data signals in a motor vehicle on-board power system containing a plurality of supply lines which, for current and/or voltage supply of consumers, are connected to the consumers, a plurality of communication units are connected to the supply lines at different points of the motor vehicle on-board power system and receive data, which comprises the steps of:

- providing the motor vehicle on-board power system according to claim 1, with the plurality of subnet works which are separated from one another and not interconnected such that no line-connected data transmission is possible between the subnet works; and
- setting up with the communications units using the supply lines, a meshed data network extending over separate subnet works and transmitting data signals formed from received data via the meshed data network to a destination device, so that communications between the communication units in the separate subnet works is enabled by injecting the data signal through a crosstalk effect from one unshielded supply line of a first subnet work into an unshielded supply line of a second, separate subnet work;
- forwarding received data, with each individual communication unit configured as a repeater, to a next communication unit, unless the received data is intended for the current consumer.

* * * * *